United States Patent
Hofmann et al.

(10) Patent No.: US 10,989,300 B2
(45) Date of Patent: Apr. 27, 2021

(54) OPERATING METHOD FOR AN AUTOMATIC TRANSMISSION OF A MOTOR VEHICLE

(71) Applicant: Volkswagen Aktiengesellschaft, Wolfsburg (DE)

(72) Inventors: Rainer Hofmann, Helmstedt (DE); Axel Schamscha, Leiferde (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/628,340

(22) PCT Filed: Jun. 26, 2018

(86) PCT No.: PCT/EP2018/067133
§ 371 (c)(1),
(2) Date: Jan. 3, 2020

(87) PCT Pub. No.: WO2019/007758
PCT Pub. Date: Jan. 10, 2019

(65) Prior Publication Data
US 2020/0173549 A1    Jun. 4, 2020

(30) Foreign Application Priority Data
Jul. 7, 2017   (DE) ...................... 10 2017 211 656.0

(51) Int. Cl.
*F16H 61/16* (2006.01)
*B60T 8/1761* (2006.01)
(Continued)

(52) U.S. Cl.
CPC .......... *F16H 61/16* (2013.01); *B60T 8/17616* (2013.01); *F16H 59/54* (2013.01);
(Continued)

(58) Field of Classification Search
CPC .......... F16H 61/16; F16H 59/54; F16H 61/18; F16H 61/682; F16H 2061/163;
(Continued)

(56) References Cited

U.S. PATENT DOCUMENTS

| | | | |
|---|---|---|---|
| 6,356,188 B1 | 3/2002 | Meyers et al. | 340/440 |
| 6,397,127 B1 | 5/2002 | Meyers et al. | 701/1 |

(Continued)

FOREIGN PATENT DOCUMENTS

| | | | | |
|---|---|---|---|---|
| DE | 102017211656 A1 | 1/1919 | ............. | B60T 8/172 |
| DE | 10146724 A1 | 4/2002 | ............. | B60R 16/02 |

(Continued)

OTHER PUBLICATIONS

German Search Report, Application No. 102017211656.0, 7 pages, dated Apr. 25, 2018.
(Continued)

*Primary Examiner* — Justin Holmes
(74) *Attorney, Agent, or Firm* — Slayden Grubert Beard PLLC

(57) ABSTRACT

The invention relates to an operating method for an automatic transmission, particularly for an automatic variable-speed transmission and/or dual-clutch transmission, for a motor vehicle. The automatic transmission can be operated in a cost-effective manner, particularly with reduced component wear and increased service life, and/or the driving comfort of the vehicle can be improved such that when lifting of at least one driven vehicle wheel off the roadway during braking is detected by the operating method, then for the length of said braking process, in the event of an incomplete gear change into a gear of the transmission, the engagement of a gear is prevented and/or the beginning of a gear change into a gear of the transmission is prevented.

20 Claims, 5 Drawing Sheets

(51) Int. Cl.
*F16H 59/54* (2006.01)
*F16H 61/18* (2006.01)
*F16H 61/682* (2006.01)

(52) U.S. Cl.
CPC ........... *F16H 61/18* (2013.01); *F16H 61/682* (2013.01); *B60T 2240/00* (2013.01); *B60T 2240/06* (2013.01); *B60T 2250/04* (2013.01); *B60T 2260/04* (2013.01); *F16H 2061/163* (2013.01); *F16H 2061/168* (2013.01)

(58) Field of Classification Search
CPC ........... F16H 2061/168; B60T 8/17616; B60T 2240/00; B60T 2240/06; B60T 2250/04; B60T 2260/04; B60T 8/175
See application file for complete search history.

(56) References Cited

U.S. PATENT DOCUMENTS

| | | | |
|---|---|---|---|
| 8,244,443 B2* | 8/2012 | Oshima | B60T 8/1706 701/71 |
| 8,742,911 B2 | 6/2014 | Wagner et al. | 340/438 |
| 2005/0140207 A1* | 6/2005 | Goebels | B60T 8/17616 303/140 |
| 2006/0190143 A1 | 8/2006 | Bauer | 701/1 |
| 2009/0240399 A1* | 9/2009 | Dagenais | B62K 5/027 701/42 |

FOREIGN PATENT DOCUMENTS

| | | | |
|---|---|---|---|
| DE | 10146725 A1 | 4/2002 | ........... B60G 17/016 |
| DE | 102007004042 A1 | 8/2007 | ................ B60T 8/30 |
| DE | 102010007008 A1 | 8/2011 | ............. B60C 23/02 |
| EP | 0943513 A2 | 9/1999 | |
| EP | 2031281 A2 | 3/2009 | .............. B62J 99/00 |
| FR | 2841834 A1 | 1/2004 | ............ B60T 8/1761 |
| JP | 2007239809 A | 9/2007 | ............. F16H 61/16 |
| WO | 2019/007758 A1 | 1/1919 | ............. F16H 59/54 |
| WO | 2005/095133 A1 | 10/2005 | ........... B60G 17/016 |

OTHER PUBLICATIONS

International Search Report and Written Opinion, Application No. PCT/EP2018/067133, 7 pages, dated Oct. 31, 2018.

* cited by examiner

OPERATING METHOD FOR AN AUTOMATIC TRANSMISSION OF A MOTOR VEHICLE

CROSS-REFERENCE TO RELATED APPLICATIONS

This application claims priority to German Patent Application No. DE 10 2017 211 656.0, filed on Jul. 7, 2017 with the German Patent and Trademark Office. The contents of the aforesaid Patent Application are incorporated herein for all purposes.

TECHNICAL FIELD

The invention relates to an operating method for an automatic transmission, particularly an automatic variable-speed transmission and/or dual-clutch transmission of a motor vehicle.

BACKGROUND

Motor vehicle transmissions, such as automatic variable-speed transmissions and/or dual-clutch transmissions, generally have at least one or more respective gear selectors for engaging at least one specific gear or more respective specific gears of the transmission. Gear selectors of this kind may for example be designed and/or implemented in the form of a movable/slidable sliding sleeve. A change wheel of the gear to be changed or of the gear stage to be engaged, which may for example be designed in the form of a loose wheel, must then be rotatably connected to a shaft of the transmission and released or decoupled therefrom. A gear or gear stage therefore in particular has two toothed wheels, in particular a fixed wheel and a change wheel (loose wheel), a synchronization mechanism and/or a gear selector, in particular, being provided in the region of the change wheel.

In order to synchronize the rotational speed of the relevant shaft with the rotational speed of the change wheel, a synchronization mechanism may be provided which blocks engagement of the specific gear, in particular engagement of the gear selector in the change wheel, when the rotational speeds are different and allows said engagement when the rotational speeds are the same.

During a normal gear change, the gear selector of a specific gear, for example the third gear of the transmission, is generally initially in a neutral position. The rotational speed of the change wheel of the specific gear may be undefined. Then, the gear selector is moved into a synchronous position. If the rotational speed of the gear selector and of the change wheel are different, the synchronization mechanism blocks the gear selector. The rotational speeds of the gear selector and of the change wheel are then synchronized, in particular the rotational speed of the shaft to be synchronized is brought to the synchronous rotational speed. Once the rotational speeds of the gear selector and of the change wheel have been equalized, the synchronization mechanism no longer blocks the gear selector, which can then engage in the change wheel, for example after a brief period of time in a so-called free-flight phase, and rotatably connect the change wheel to the shaft and thus engage the gear.

EP 2 031 281 A2 discloses a transmission control device for a motorcycle, in which a control unit prevents automatic shifting if the speed of rotation of the rear wheel exceeds the speed of rotation of the front wheel by at least a specific value. If a photodetector detects lifting of the front wheel off the roadway, a transmission of drive to the rear wheel is interrupted by opening a clutch.

A system for detecting lifting of one or more wheels of a vehicle off the roadway is disclosed in US 2006/0190143 A1, in which a sensor measures a wheel speed of at least one wheel and a control unit calculates the resonant frequency and resonant frequency changes of said wheel and lifting of a wheel off the roadway is detected if the resonant frequency changes exceed a threshold value.

A method for detecting lifting of a wheel of a motor vehicle off a roadway is disclosed in DE 101 46 724 A1, in which a change of torque is exerted on the wheel, a change of wheel state is measured and lifting of a wheel is indicated if the change of wheel state is greater than a predefined threshold value.

A control device for a vehicle is disclosed in EP 0 943 513 A2, which determines a lateral moment of the vehicle body during forward movement in order to estimate the behavior of the vehicle body based on the speeds of the wheels thereof and the lateral moment and in order to calculate a target braking force to be applied by the respective brake actuators. Lifting of one of the wheels off the roadway can thereby be detected based on the wheel speeds and the lateral moment.

However, the methods known in the prior art are still not optimally designed. For example, during braking on a roadway in poor condition and/or during travel around a bend, one or more driven vehicle wheels of the vehicle may lift off the roadway. By means of a braking torque applied during braking, a driven vehicle wheel that has lifted off the roadway can be braked to a complete standstill, for example to 0 km/h, while in the lifted state and then experience very strong acceleration to the vehicle speed when it lands back on the roadway. As a result, the rotational speed of the gear selector operatively connected to the lifted, driven vehicle wheel (or the switch wheel), in particular via the transmission output shaft, is initially reduced to zero and then increased strongly again, which can lead to very high differences in rotational speed, of for example up to approximately 1000 rpm, between the gear selector and change wheel or the transmission output shaft and transmission input shaft. In spite of a previously successful synchronization, the relevant gear selector may therefore no longer be moving in unison with the change wheel. If the gear selector is in the free-flight phase, it still tries to engage in the change wheel, which, on account of the potentially very high difference in rotational speed, can lead to grinding between the components and thus to component wear and to reduced driving comfort on account of disruptive noises.

SUMMARY

An object is therefore to design and develop an operating method for an automatic transmission such that the transmission can be operated in a cost-effective manner, particularly with reduced component wear and/or increased service life, and/or the driving comfort of the vehicle can be improved.

The object is solved by an operating method for an automatic transmission, such as for example an automatic variable-speed transmission and/or dual-clutch transmission of a motor vehicle having the features of claim 1.

BRIEF DESCRIPTION OF THE DRAWINGS

Figure 1:
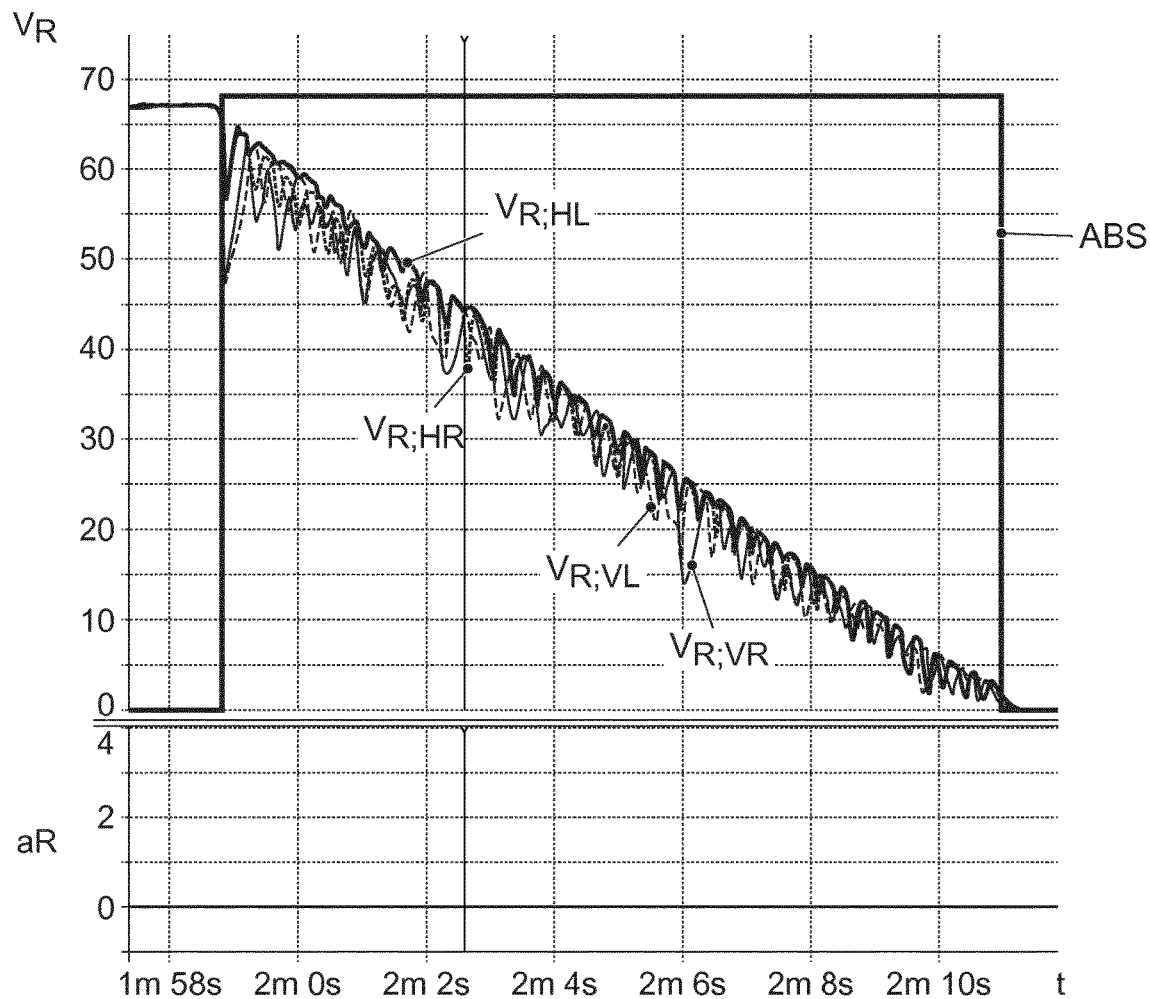
Figure 2:
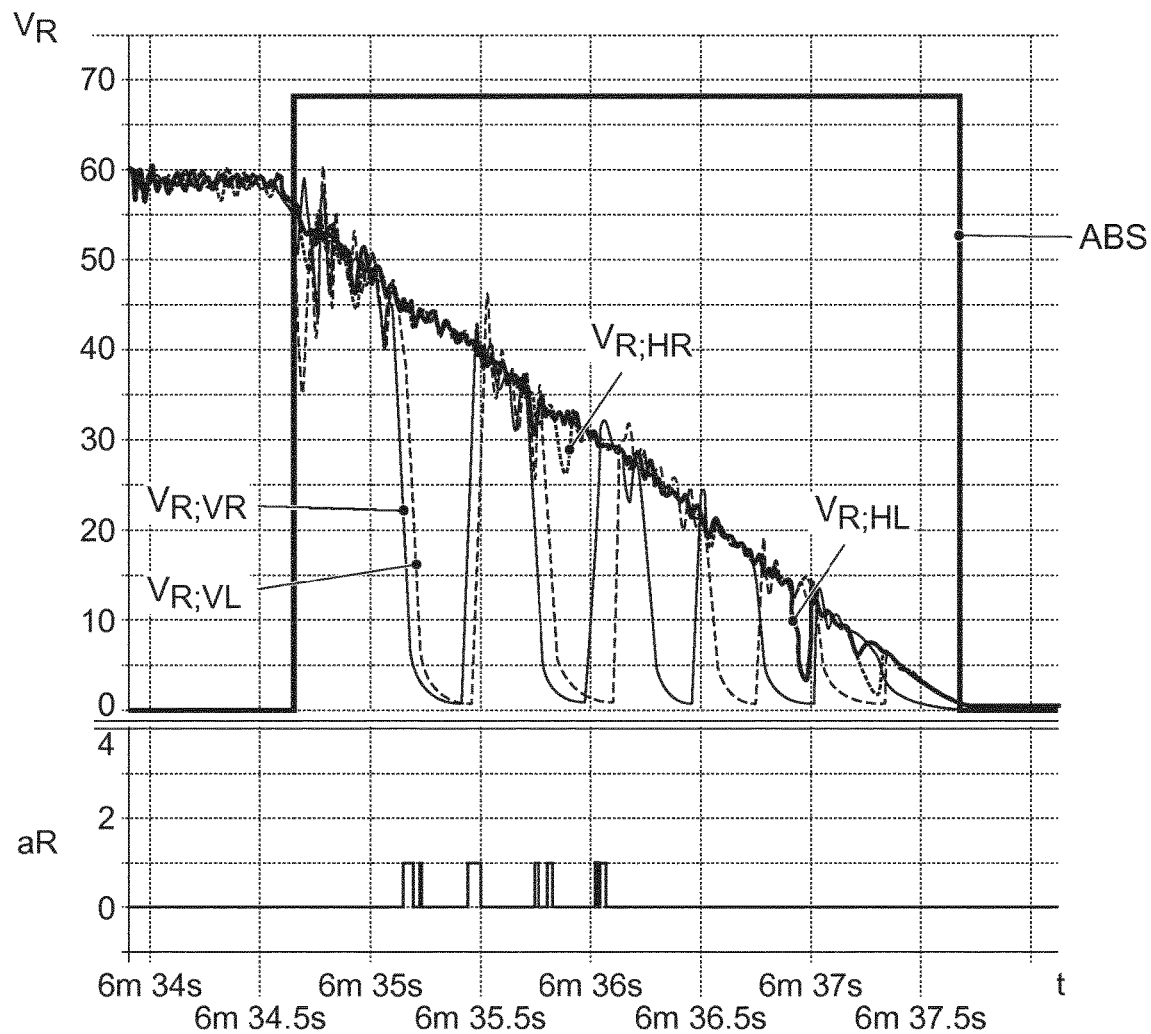
Figure 3:
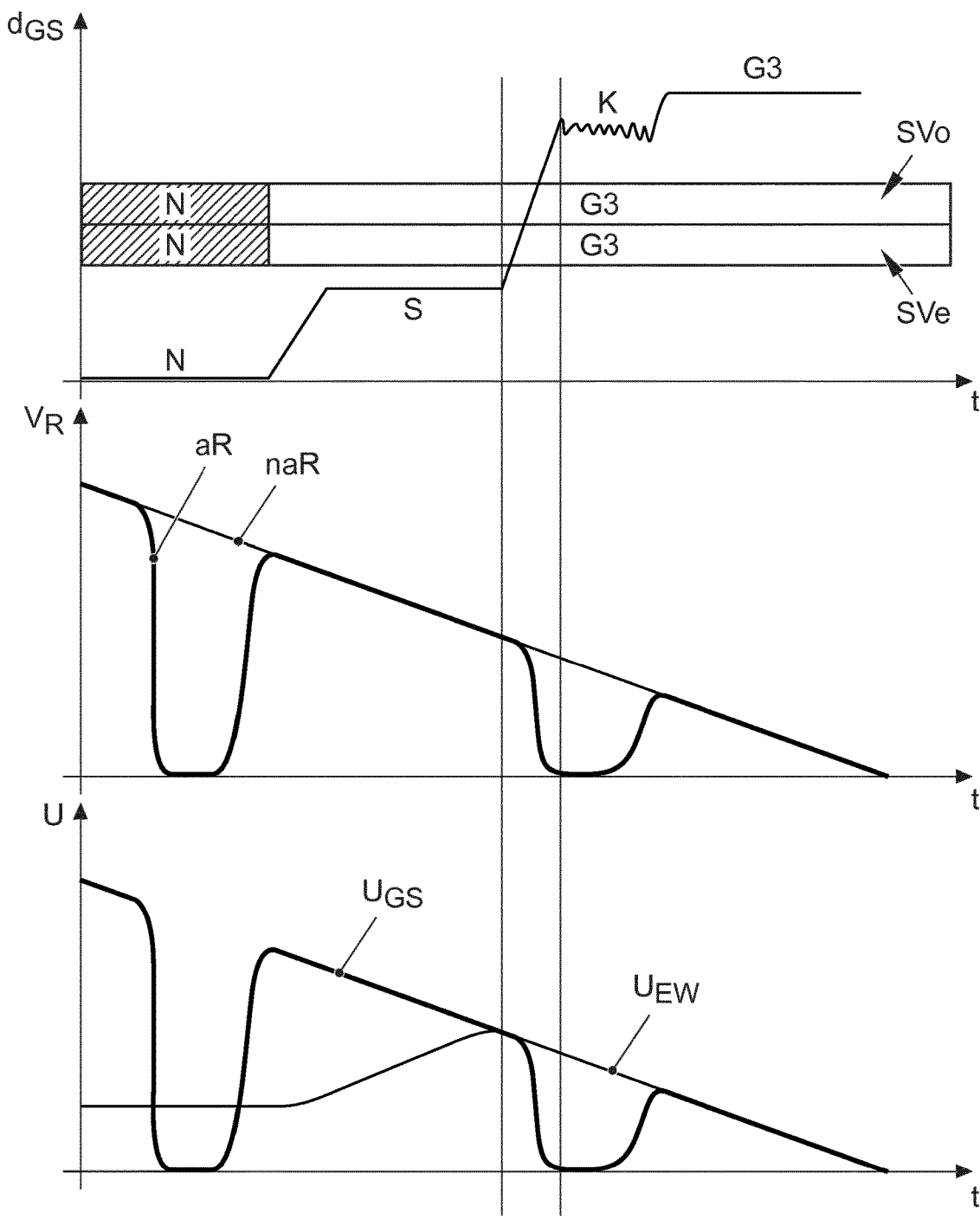
Figure 4:
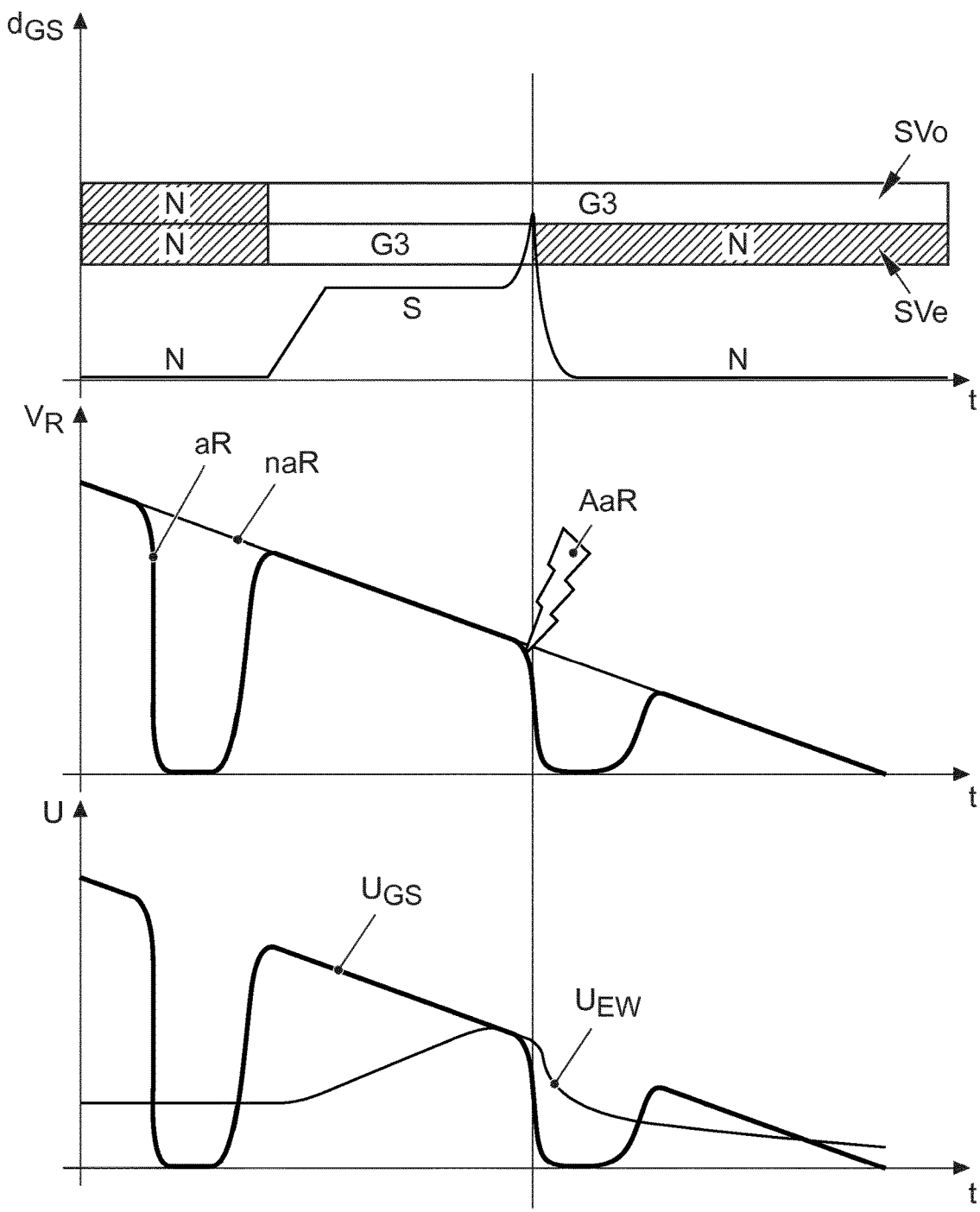
Figure 5:
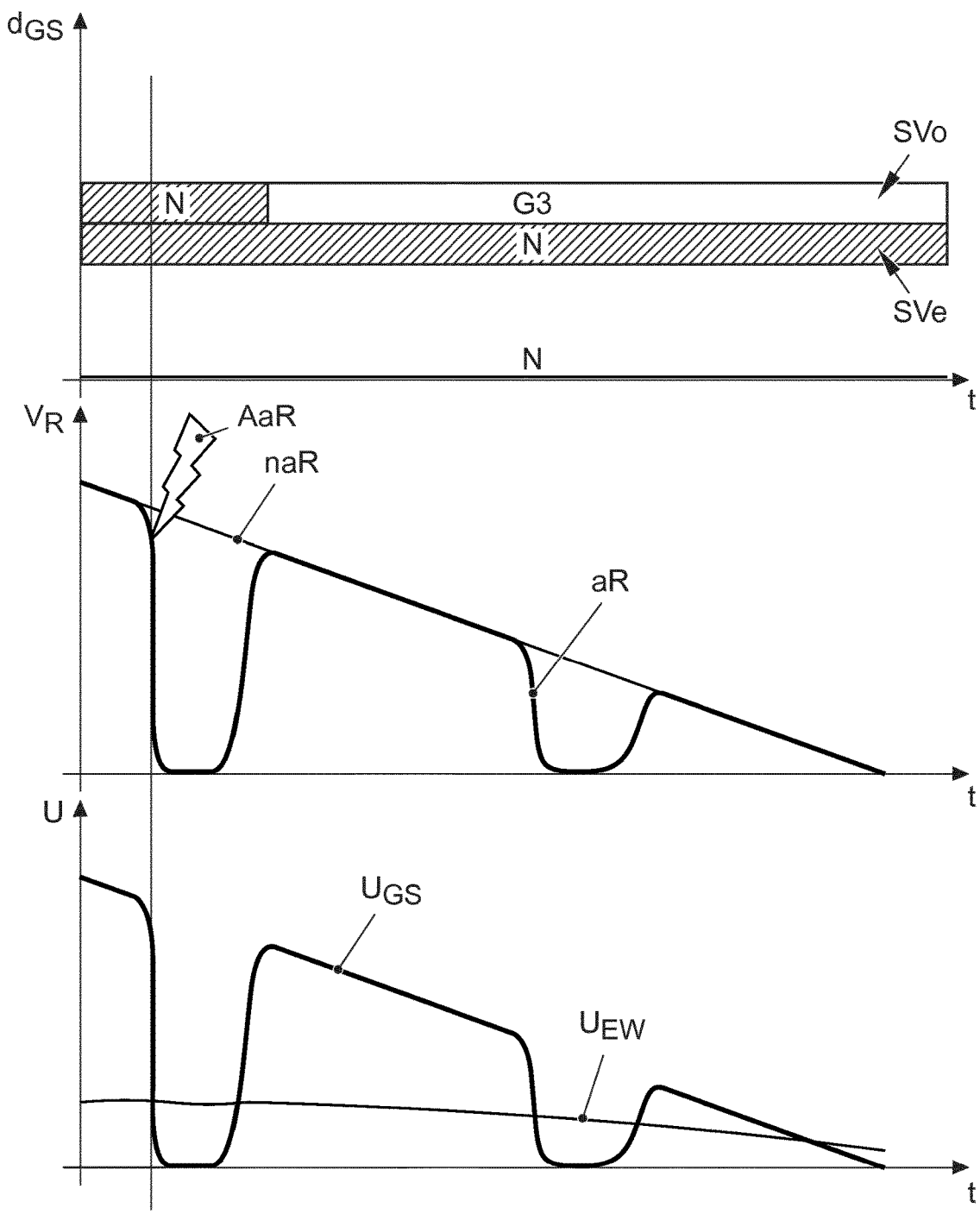

IN THE FIGS.:

FIG. 1 shows a braking process by means of an anti-lock braking system without lifting of vehicle wheels in schematic graphs;

FIG. 2 shows a braking process by means of an anti-lock braking system with lifting of vehicle wheels in schematic graphs;

FIG. 3 shows schematic graphs for illustrating a gear change during a braking process with a lifted, driven vehicle wheel in accordance with a conventional transmission strategy for an automatic transmission;

FIG. 4 shows schematic graphs for illustrating a gear change during a braking process with a lifted, driven vehicle wheel using an embodiment of an operating method for an automatic transmission, in which embodiment engagement of the gear is prevented for the length of said braking process in the event of an incomplete gear change; and FIG. 5 shows schematic graphs for illustrating a gear change during a braking process with a lifted, driven vehicle wheel using another embodiment of an operating method for an automatic transmission, in which embodiment the beginning of a gear change is prevented for the length of said braking process.

DETAILED DESCRIPTION

In the method according to an exemplary aspect, when lifting of at least one driven vehicle wheel off the roadway during braking is detected, for the length of said braking process,

- in the event of an incomplete gear change into a gear, for example a new gear, of the transmission, the engagement of the gear, particularly of a gear selector of said gear, and/or
- the beginning of a gear change into a gear, particularly a new gear, of the transmission is prevented and/or inhibited.

Because the engagement of the gear, for example of the gear selector, is prevented for the length of the braking process in the event of an incomplete gear change, grinding can be prevented and thus component wear, for example of the gear selector and/or an associated switch wheel, can be reduced and/or the service life can be increased and/or driving comfort of the vehicle can be improved by preventing disruptive noises.

Because the beginning of a gear change, for example all gear changes, is prevented for the length of the braking process, a non-functional synchronization mechanism and grinding can be prevented and thus component wear, for example of the synchronization mechanism and for example also of the gear selector and/or an associated switch wheel, can be reduced and/or the service life can be increased and/or the driving comfort of the vehicle can be improved by preventing disruptive noises.

In this way, the transmission can be operated in a cost-effective manner, particularly with reduced component wear, and/or the driving comfort can be improved by preventing disruptive noises. The transmission itself may potentially also be produced in a more cost-effective manner, since the components thereof can be designed to be less robust and thus more cost-effective.

In some embodiments, when lifting of at least one driven vehicle wheel off the roadway during braking is detected, then for the length of said braking process, in the event of an incomplete gear change into a gear, such as a new gear, of the transmission, engagement of a gear selector of the gear and/or the beginning of, e.g. all, gear changes into gears of the transmission can be prevented. For example, when lifting of at least one driven vehicle wheel off the roadway during braking is detected, then in the event of an incomplete gear change, the engagement of a gear, e.g. a new gear, of the transmission in an inactive sub-transmission of a dual-clutch transmission, such as a gear selector of the gear, and/or the beginning of a gear change into a gear, such as a new gear, of the transmission in an inactive sub-transmission of a dual-clutch transmission, for example the beginning of a synchronization of the gear, such as the new gear, can be prevented. For example, when lifting of at least one driven vehicle wheel off the roadway during braking is detected, a default gear engagement and/or change, which would be requested in a normal state in accordance with the transmission strategy, and/or a desired gear engagement and/or change of the vehicle driver can be suppressed.

In the event of an incomplete gear change into a gear of the transmission, synchronization may for example already be taking place. The fact that, when lifting of at least one driven vehicle wheel off the roadway during braking is detected, the engagement of the gear, such as of the gear selector of the gear, is prevented, this can for example result in the synchronization being continued until the end of said braking process.

However, in one embodiment, when lifting of at least one driven vehicle wheel off the roadway during braking is detected, then in the event of an incomplete gear change into a gear of the transmission, the gear change, and thus also an ongoing synchronization of said gear change, for example, is stopped and the relevant gear selector is put into a neutral position. This way, the components involved in the synchronization can be spared and material and energy can be saved.

In another embodiment, the braking process is a braking process by means of an active anti-lock braking system (ABS), e.g., if, during said braking process, lifting of at least one driven vehicle wheel off the roadway is detected. The operating method can be carried out in an especially simple manner by means of an active anti-lock braking system.

In one embodiment thereof, the braking process is considered finished when the anti-lock braking system is deactivated.

The wheel speeds of the individual vehicle wheels and/or the wheel speed gradients of the individual vehicle wheels and/or differences between wheel speeds of the vehicle wheels may for example be used for detecting lifting of a driven vehicle wheel.

In a first embodiment, the lifting of a driven vehicle wheel off the roadway is detected if during a braking process, such as one carried out by means of an active anti-lock braking system, the wheel speed of the driven wheel is less than a reference speed by a specific speed amount (x km/h). If a vehicle wheel lifts off the roadway during a braking process, the lifted vehicle wheel, even at a braking pressure reduced to a minimum, is braked or decelerated more strongly by means of the braking process than the vehicle or the vehicle wheels that are in contact with the roadway, to which other vehicle wheels a force produced by the roadway is applied by means of rolling on the roadway. Therefore, lifting of a driven vehicle wheel can be detected on account of the fact that the wheel speed thereof is less by a specific speed amount (x km/h) than a reference speed based e.g. on a, for example evaluated, vehicle speed and/or based on a mean wheel speed value. Since a control mechanism for the active anti-lock braking system normally prevents significant differences between the wheel speeds, this detection method can also be particularly efficient in the case of a braking process using an active anti-lock braking system.

In a second embodiment, the lifting of a driven vehicle wheel off the roadway is detected if during a braking process, such as one carried out by means of an active anti-lock braking system, the, for example negative, wheel speed gradient of the driven wheel is less than a specific threshold value (y m/s$^2$). If a vehicle wheel lifts off the roadway during a braking process, the lifted vehicle wheel is subjected to a greater, decelerative and thus negative acceleration during the braking process than the vehicle or the vehicle wheels that are in contact with the roadway, to which vehicle wheels a force produced by the roadway is applied by means of rolling on the roadway. Therefore, lifting of a driven vehicle wheel can be detected on account of the fact that the, for example negative, wheel speed gradient thereof is less, i.e., more negative, than a specific threshold value (y m/s$^2$). Since a control mechanism for the active anti-lock braking system normally prevents significant differences between the wheel speeds, this detection method can also be especially efficient in the case of a braking process using an active anti-lock braking system.

In a third embodiment, the lifting of a driven vehicle wheel off the roadway is detected if during a braking process, such as one carried out by means of an active anti-lock braking system, the, for example negative, wheel speed gradient of the driven wheel is less than the gradient of a reference speed by a specific amount (z m/s$^2$). If a vehicle wheel lifts off the roadway during a braking process, the lifted vehicle wheel is subjected to a greater, decelerative and thus negative acceleration during the braking process than the vehicle or the vehicle wheels that are in contact with the roadway, to which vehicle wheels a force produced by the roadway is applied by means of rolling on the roadway. Therefore, lifting of a driven vehicle wheel can be detected on account of the fact that the, for example negative, wheel speed gradient thereof is less by a specific amount (z m/s$^2$) than the gradient of a reference speed based e.g. on a, for example evaluated, vehicle speed and/or based on a mean wheel speed value. Since a control mechanism for the active anti-lock braking system normally prevents significant differences between the wheel speeds, this detection method can also be particularly efficient in the case of a braking process using an active anti-lock braking system.

In a fourth embodiment, the lifting of a driven vehicle wheel off the roadway is detected by a combination of the first and second embodiment.

In a fifth embodiment, the lifting of a driven vehicle wheel off the roadway is detected by a combination of the first and third embodiment.

In a sixth embodiment, the lifting of a driven vehicle wheel off the roadway is detected if during a braking process, such as one carried out by means of an active anti-lock braking system, the, for example positive, wheel speed gradient of the driven wheel is greater than a specific threshold value (y' m/s$^2$). If a driven vehicle wheel that has lifted off the roadway during a braking process is braked in the lifted state, if applicable to a complete standstill, and then lands back on the roadway, the vehicle wheel is subjected to a greater, positive acceleration upon landing than the vehicle or the vehicle wheels that are in contact with the roadway. This acceleration may, in the event of landing after previous lifting, be significantly greater than accelerations that can be achieved in other driving situations. Therefore, lifting of a driven vehicle wheel can be detected, e.g. at a subsequent time, on account of the fact that the, for example positive, wheel speed gradient thereof is greater than a specific threshold value (y' m/s$^2$). Since a control mechanism for the active anti-lock braking system normally prevents significant differences between the wheel speeds, this detection method can also be particularly efficient in the case of a braking process using an active anti-lock braking system.

In a seventh embodiment, the lifting of a driven vehicle wheel off the roadway is detected if during a braking process, such as carried out by means of an active anti-lock braking system, the, e.g. positive, wheel speed gradient of the driven wheel is greater than the gradient of a reference speed by a specific amount (z' m/s$^2$). If a driven vehicle wheel that has lifted off the roadway during a braking process is braked in the lifted state, if applicable to a complete standstill, and then lands back on the roadway, the vehicle wheel is subjected to a greater, positive acceleration upon landing than the vehicle or the vehicle wheels that are in contact with the roadway. This acceleration may, in the event of landing after previous lifting, be significantly greater than accelerations that can be achieved in other driving situations. Therefore, lifting of a driven vehicle wheel can, e.g. at a subsequent time, be detected on account of the fact that the, for example positive, wheel speed gradient thereof is greater than the gradient of a reference speed by a specific amount (z' m/s$^2$). Since a control mechanism for the active anti-lock braking system normally prevents significant differences between the wheel speeds, this detection method can also be particularly efficient in the case of a braking process using an active anti-lock braking system.

In an eighth embodiment, the lifting of a driven vehicle wheel off the roadway is detected by a combination of the first and sixth embodiment.

In a ninth embodiment, the lifting of a driven vehicle wheel off the roadway is detected by a combination of the first and seventh embodiment.

In another embodiment:
the mean value of the wheel speeds of all vehicle wheels, or
the mean value of the wheel speeds of the vehicle wheels of a non-driven axle of the vehicle, or
an evaluated vehicle speed, which is determined in that the plausibility of the wheel speeds is determined and the vehicle speed is only determined from the plausible wheel speeds,
is used as the reference speed. With regard to the evaluated vehicle speed, wheel speeds that for example accelerate or decelerate more strongly than is plausible are evaluated as implausible and are therefore not used to form the evaluated vehicle speed.

In the case of a braking process by means of an active anti-lock braking system, signals such as the wheel speed/s and/or wheel speed gradient/s may for example be analyzed only after a specific dead time. During the specific dead time, the anti-lock braking system may for example firstly adjust the braking pressure and/or allow the control systems to settle. A time span of approximately 100 ms from activation of the anti-lock braking system braking process, for example, has proven ideal as the specific dead time for the start of the analysis.

The operating method may, e.g., be intended for an automatic transmission, for example an automatic variable-speed transmission and/or a dual-clutch transmission, for a motor vehicle having at least three wheels, such as having at least four wheels.

For example, the operating method may be intended for an automatic transmission, for example an automatic variable-speed transmission and/or dual-clutch transmission, for a motor vehicle having four wheels and front-wheel drive. The method may then, e.g., be carried out if lifting of at least one driven vehicle wheel of the front axle or if lifting of at least one driven front wheel is detected.

However, the operating method may, e.g., also be intended for an automatic transmission, for example an automatic variable-speed transmission and/or dual-clutch transmission, for a motor vehicle having four wheels and rear-wheel drive. The method may then, e.g., be carried out if lifting of at least one driven vehicle wheel of the rear axle or if lifting of at least one driven rear wheel is detected.

However, the operating method may for example also be intended for an automatic transmission, for example an automatic variable-speed transmission and/or dual-clutch transmission, for a motor vehicle having four wheels and all-wheel drive. The method may then, e.g., be carried out if lifting of at least one driven vehicle wheel of the front axle or if lifting of at least one driven front wheel and/or if lifting of at least one driven vehicle wheel of the rear axle or if lifting of at least one driven rear wheel is detected.

There are many options for designing and developing the operating method according to the present disclosure further. In this regard, reference is first made to the claims dependent on claim 1. In the following, some embodiments of the operating method will be explained in greater detail with reference to the drawing and the associated description.

FIGS. 1 and 2 each show schematic graphs for illustrating wheel speed gradients during a braking process by means of an active anti-lock braking system ABS in the top window, in which graphs the wheel speeds $v_R$, $v_{R,VL}$, $v_R$, $v_{R,VR}$, $v_{R,HL}$, $v_{R,HR}$ of the left and right front wheel $v_{R,VL}$, $v_{R,VR}$ and of the left and right rear wheel $v_{R,HL}$, $v_{R,HR}$ of a motor vehicle are plotted against time t.

In the bottom window, FIGS. 1 and 2 each have graphs in which a lifted status of a driven vehicle wheel aR is plotted against time t.

FIG. 1 shows ABS braking without lifting of vehicle wheels.

FIG. 2 shows ABS braking during which the left and right driven front wheels of the vehicle lift off the roadway and illustrates that, in the event of lifting of a driven vehicle wheel aR,
the wheel speed $v_{R,VL}$, $v_{R,VR}$ thereof is less by a specific speed amount than a reference speed, based for example on the wheel speeds of the non-lifted and/or non-driven rear wheels $v_{R,HL}$, $v_{R,HR}$, and
the negative wheel speed gradient $v_{R,VL}$, $v_{R,VR}$ thereof is less than a specific threshold value and is less by a specific amount than the gradient of a reference speed, based for example on the wheel speeds of the non-lifted and/or non-driven rear wheels $v_{R,HL}$, $v_{R,HR}$, and
the positive wheel speed gradient $v_{R,VL}$, $v_{R,VR}$ thereof is greater than a specific threshold value and is greater by a specific amount than the gradient of a reference speed, based for example on the wheel speeds of the non-lifted and/or non-driven rear wheels $v_{R,HL}$, $v_{R,HR}$,
and therefore illustrates that, by meeting only at least one of said above-mentioned criteria in particular, lifting of a vehicle wheel off the roadway can be detected.

For example, by means of a combination of:
a wheel speed $v_{R,VL}$, $v_{R,VR}$ that is less than the reference speed by a specific speed amount, and
a negative wheel speed gradient $v_{R,VL}$, $v_{R,VR}$ that is less than the gradient of the reference speed by a specific amount, or by means of a combination of
a wheel speed $v_{R,VL}$, $v_{R,VR}$ that is less than the reference speed by a specific speed amount, and
a positive wheel speed gradient $v_{R,VL}$, $v_{R,VR}$ that is greater than the gradient of the reference speed by a specific amount,
lifting of a driven vehicle wheel aR can be detected.

FIGS. 3, 4 and 5 each show schematic graphs in the top window in which the displacement $d_{GS}$ of a gear selector, for example in the form of a sliding sleeve, of a gear of an automatic transmission, a default gear change SVo for the gear selector that would be requested in a normal state in accordance with a conventional transmission strategy, and a gear-change behavior SVe of the gear selector in accordance with a conventional transmission strategy (see FIG. 3) or in accordance with an operating method as discussed in the preceding (see FIGS. 4 and 5) are plotted against time t.

FIGS. 3, 4 and 5 each show schematic graphs in the central window in which wheel speeds of driven vehicle wheels aR and non-driven vehicle wheels naR are plotted against time t.

FIGS. 3, 4 and 5 each show schematic graphs in the bottom window in which the rotational speed $U_{GS}$ of a gear selector operatively connected to the driven vehicle wheels aR or of a transmission output shaft of the transmission operatively connected to the driven vehicle wheels aR and the rotational speed $U_{EW}$ of a change wheel, for example in the form of a loose wheel, of the gear or of a transmission input shaft of the transmission are plotted against time t.

FIG. 3 illustrates a gear change in accordance with a conventional transmission strategy for an automatic transmission during braking, for example by means of an active anti-lock braking system, with a lifted, driven vehicle wheel aR.

The top window of FIG. 3 shows that, in accordance with a default gear change SVo, the gear selector is supposed to be shifted from a neutral position N into a gear G3, for example into the third gear, of the transmission. As the gear-change behavior SVe shows, the gear selector is shifted into the, for example third, gear G3 from the neutral position N in accordance with the default gear change SVo. The gear selector is initially moved from a position for the neutral position N into a position for synchronization S. After completion of the synchronization S, the gear selector is supposed to then become engaged in the, for example third, gear G3, the gear selector for example meshing with a change wheel of the gear G3. However, before this happens, grinding K between the gear selector and the change wheel occurs, for example during sliding of a gear selector in the form of a sliding sleeve onto (stub) toothing of the change wheel.

The central and bottom window of FIG. 3 illustrate that the grinding K was caused by asynchronous shifting of the gear selector. This was in turn caused by the fact that, after the synchronization S, a driven vehicle wheel aR that is operatively connected to the gear selector, for example via a synchronous body and for example also via a transmission output shaft and/or a differential, lifted off the roadway and was braked to a standstill by means of the braking process. As a result, the wheel speed $v_R$ thereof and, on account of the operative connection to the gear selector, also the rotational speed of the gear selector $U_{GS}$ has reduced to 0 km/h or rpm, as a result of which the rotational speed of the gear selector $U_{GS}$, in spite of the previously successfully performed synchronization, has become asynchronous with the rotational speed $U_{EW}$ of the change wheel or transmission input shaft.

FIG. 4 illustrates a gear change in accordance with an embodiment of the operating method for an automatic transmission during braking, for example by means of an active anti-lock braking system, with a lifted, driven vehicle wheel aR.

FIG. 4 shows that, when the lifting of the driven vehicle wheel aR off the roadway is detected $A_{aR}$, for example on account of the reduction of the wheel speed $v_R$ of the driven vehicle wheel aR, in the event of an incomplete gear change, for example after the synchronization, the engagement of the gear G3 is prevented or stopped for the length of said braking process. The incomplete gear change, in particular, is thereby stopped and the gear selector is shifted into the position for the neutral position N of the transmission for the length of said braking process. In addition, the beginning of, for example other, gear changes can in particular also be prevented for the length of said braking process. This way, asynchronous shifting and thus grinding between the gear selector and the change wheel can be prevented.

FIG. 5 illustrates a gear change in accordance with another embodiment of the operating method for an automatic transmission during braking, for example by means of an active anti-lock braking system, with a lifted, driven vehicle wheel aR.

FIG. 5 shows that, when the lifting of the driven vehicle wheel aR off the roadway is detected $A_{aR}$, for example on account of the reduction of the wheel speed $v_R$ of the driven vehicle wheel aR, in particular before a gear change was begun, for example before a synchronization procedure and/or gear-engagement procedure was begun, the beginning of gear changes is prevented for the length of said braking process. The gear selector is thereby held in the position for the neutral position N for the length of said braking process. This way, asynchronous shifting and thus grinding between the gear selector and the change wheel can also be prevented.

REFERENCE NUMBER LIST aR Lifted, driven vehicle wheel
naR Non-lifted, driven vehicle wheel
ABS Anti-lock braking system
t Time
$v_R$ Wheel speed
$v_{R,VL}$ Wheel speed of the left front wheel
$v_{R,VR}$ Wheel speed of the right front wheel
$v_{R,HL}$ Wheel speed of the left rear wheel
$v_{R,HR}$ Wheel speed of the right rear wheel
$d_{GS}$ Displacement of the gear selector
SVo Default gear change
SVe Gear-change behavior
N Neutral position
S Synchronization
K Grinding of the gear selector
G3 Gear, for example third gear
U Rotational speed
$U_{EW}$ Transmission input shaft rotational speed
$U_{GS}$ Gear selector or transmission output shaft rotational speed
$A_{aR}$ Detection of a lifted, driven vehicle wheel The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. An operating method for an automatic transmission for a motor vehicle, wherein, when a lifting of at least one driven vehicle wheel off the roadway during braking is detected, then for the length of a braking process,
   in the event of an incomplete gear change into a gear of the transmission, the engagement of the gear is prevented, and/or
   the beginning of a gear change into a gear of the transmission is prevented.

2. The operating method of claim 1, wherein, in the event of an incomplete gear change into a gear of the transmission, the gear change is stopped and/or the relevant gear selector is shifted into a neutral position.

3. The operating method of claim 1, wherein the braking process is a braking process of an active anti-lock braking system.

4. The operating method of claim 3, wherein the braking process is considered finished when the anti-lock braking system is deactivated.

5. The operating method of claim 1, wherein the lifting of a driven vehicle wheel off the roadway is detected if during the braking process, particularly one carried out using an active anti-lock braking system, a wheel speed of the driven wheel is less than a reference speed by a specific speed amount.

6. The operating method of claim 1, wherein the lifting of a driven vehicle wheel off the roadway is detected if during the braking process, particularly one carried out by means of an active anti-lock braking system, a negative wheel speed gradient of the driven wheel is less than a specific threshold value.

7. The operating method of claim 1, wherein the lifting of a driven vehicle wheel off the roadway is detected if during the braking process, particularly one carried out by means of an active anti-lock braking system, a negative wheel speed gradient of the driven wheel is less than a gradient of a reference speed by a specific amount.

8. The operating method of claim 1, wherein the lifting of a driven vehicle wheel off the roadway is detected if during the braking process, particularly one carried out by means of an active anti-lock braking system, a positive wheel speed gradient of the driven wheel is greater than a specific threshold value.

9. The operating method of claim 1, wherein the lifting of a driven vehicle wheel off the roadway is detected if during the braking process, particularly one carried out by means of an active anti-lock braking system, a positive wheel speed gradient of the driven wheel is greater than a gradient of a reference speed by a specific amount.

10. The operating method of claim 1, wherein
   a mean value of the wheel speeds of all vehicle wheels or
   a mean value of the wheel speeds of the vehicle wheels of a non-driven axle of the vehicle or
   an evaluated vehicle speed, which is determined in that a plausibility of the wheel speeds is determined and a vehicle speed is only determined from the plausible wheel speeds,
   is used as the reference speed.

11. The operating method of claim 1, wherein the automatic transmission is one or more of an automatic variable-speed transmission and a dual-clutch transmission.

12. The operating method of claim 2, wherein the braking process is a braking process of an active anti-lock braking system.

13. The operating method of claim 12, wherein the braking process is considered finished when the anti-lock braking system is deactivated.

14. The operating method of claim 2, wherein the lifting of a driven vehicle wheel off the roadway is detected if during the braking process, particularly one carried out using an active anti-lock braking system, a wheel speed of the driven wheel is less than a reference speed by a specific speed amount.

15. The operating method of claim 3, wherein the lifting of a driven vehicle wheel off the roadway is detected if during the braking process, particularly one carried out using an active anti-lock braking system, a wheel speed of the driven wheel is less than a reference speed by a specific speed amount.

16. The operating method of claim 4, wherein the lifting of a driven vehicle wheel off the roadway is detected if during the braking process, particularly one carried out using an active anti-lock braking system, a wheel speed of the driven wheel is less than a reference speed by a specific speed amount.

17. The operating method of claim 2, wherein the lifting of a driven vehicle wheel off the roadway is detected if during the braking process, particularly one carried out by means of an active anti-lock braking system, a negative wheel speed gradient of the driven wheel is less than a specific threshold value.

18. The operating method of claim 3, wherein the lifting of a driven vehicle wheel off the roadway is detected if during the braking process, particularly one carried out by means of an active anti-lock braking system, a negative wheel speed gradient of the driven wheel is less than a specific threshold value.

19. The operating method of claim 4, wherein the lifting of a driven vehicle wheel off the roadway is detected if during the braking process, particularly one carried out by means of an active anti-lock braking system, a negative wheel speed gradient of the driven wheel is less than a specific threshold value.

20. The operating method of claim 5, wherein the lifting of a driven vehicle wheel off the roadway is detected if during the braking process, particularly one carried out by means of an active anti-lock braking system, a negative wheel speed gradient of the driven wheel is less than a specific threshold value.

* * * * *